United States Patent
Schneider et al.

(10) Patent No.: US 9,077,053 B2
(45) Date of Patent: Jul. 7, 2015

(54) BATTERY CHARGER INCLUDING MULTIPLE CHARGING PORTS ON SURFACES FORMING AN APEX

(75) Inventors: Scott Schneider, Waukesha, WI (US); Christian Coulis, Sussex, WI (US); James S. Hull, Burlington, WI (US); Jay Rosenbecker, Menomonee Falls, WI (US); Scott D. Bublitz, Hartland, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 13/554,753

(22) Filed: Jul. 20, 2012

(65) Prior Publication Data
US 2013/0044002 A1 Feb. 21, 2013

Related U.S. Application Data

(60) Provisional application No. 61/509,900, filed on Jul. 20, 2011.

(51) Int. Cl.
*H02J 7/00* (2006.01)
*H01M 10/44* (2006.01)

(52) U.S. Cl.
CPC ........... *H01M 10/441* (2013.01); *H02J 7/0013* (2013.01); *H02J 7/0045* (2013.01)

(58) Field of Classification Search
CPC .............................. H02J 7/0042; H02J 7/0045
USPC ........................................ 320/110, 112, 113
See application file for complete search history.

(56) References Cited

U.S. PATENT DOCUMENTS 5,157,318 A 10/1992 Wang
5,327,067 A * 7/1994 Scholder ...................... 320/107
(Continued)

FOREIGN PATENT DOCUMENTS

JP 2006062020 3/2006
KR 200255763 12/2001

OTHER PUBLICATIONS

Bosch BC230 Charger, available Apr. 2012, retrieved from Internet, <http://www.boschtools.com/Products/Tools/Pages/BoschProductDetail.aspx?pid=BC230>.
(Continued)

*Primary Examiner* — Yalkew Fantu
*Assistant Examiner* — Manuel Hernandez
(74) *Attorney, Agent, or Firm* — Michael Best & Friedrich LLP

(57) ABSTRACT

A battery charger for charging a first battery pack and a second battery pack includes a housing, a charging circuit positioned within the housing, and a first charging port coupled to the housing and electrically coupled to the charging circuit. The first charging port is configured to support the first battery pack and defines a first connection axis along which the first battery pack is movable to connect with the charging circuit. The battery charger also includes a second charging port coupled to the housing and electrically coupled to the charging circuit. The second charging port is configured to support the second battery pack while the first charging port supports the first battery pack. The second charging port defines a second connection axis along which the second battery pack is movable to connect with the charging circuit. The first connection axis is angled relative to the second connection axis.

25 Claims, 7 Drawing Sheets

(56) References Cited

U.S. PATENT DOCUMENTS

| | | | |
|---|---|---|---|
| 6,204,632 B1 * | 3/2001 | Nierescher et al. | 320/116 |
| 6,597,152 B1 | 7/2003 | Jacobs et al. | |
| 7,365,514 B2 | 4/2008 | Tong | |
| 7,638,970 B1 | 12/2009 | Gebhard et al. | |
| 7,843,165 B2 | 11/2010 | Sakaue et al. | |
| 7,843,167 B2 * | 11/2010 | DeRome et al. | 320/112 |
| 2005/0001593 A1 | 1/2005 | Kawasumi et al. | |
| 2007/0122692 A1 | 5/2007 | Smith et al. | |
| 2010/0060232 A1 * | 3/2010 | Boyles et al. | 320/107 |
| 2011/0006729 A1 | 1/2011 | Matthias et al. | |
| 2011/0101912 A1 | 5/2011 | Goto et al. | |
| 2014/0266048 A1 * | 9/2014 | Cunanan et al. | 320/112 |

OTHER PUBLICATIONS

International Search Report and Written Opinion for Application No. PCT/US2012/047668 Dec. 12, 2012 (8 pages).

Third Party Observation for Application PCT/US2012/047668 dated Nov. 19, 2013 (3 pages).

DC14RB Battery Charger, Catalog for Charging-Type Impact Driver, Makita, 2002, Statement of Relevance attached, 5 pages.

DC14RB Battery Charger, Makita General Catalog, Makita, 2002, Statement of Relevance attached, 6 pages.

Instruction Manual for Battery Charger DC14RB, Makita, 2002, Statement of Relevance attached, 18 pages.

* cited by examiner

BATTERY CHARGER INCLUDING MULTIPLE CHARGING PORTS ON SURFACES FORMING AN APEX

CROSS-REFERENCE TO RELATED APPLICATIONS

This application claims priority to U.S. Provisional Patent Application No. 61/509,900, filed Jul. 20, 2011, the entire contents of which are incorporated by reference herein.

FIELD OF THE INVENTION

The present invention relates to battery chargers and, more particularly, to multi-bay battery chargers for supporting and charging more than one battery.

SUMMARY

In one embodiment, the invention provides a battery charger for charging a first battery pack and a second battery pack. The battery charger includes a housing, a charging circuit positioned within the housing, and a first charging port coupled to the housing and electrically coupled to the charging circuit. The first charging port is configured to support the first battery pack. The first charging port defines a first connection axis along which the first battery pack is movable to connect with the charging circuit. The battery charger also includes a second charging port coupled to the housing and electrically coupled to the charging circuit. The second charging port is configured to support the second battery pack while the first charging port supports the first battery pack. The second charging port defines a second connection axis along which the second battery pack is movable to connect with the charging circuit. The first connection axis is angled relative to the second connection axis.

In another embodiment, the invention provides a battery charging system including a first battery pack having a first set of battery cells operable to store a first amount of energy, a second battery pack having a second set of battery cells operable to store a second amount of energy, and a battery charger for charging the first and second battery packs. The battery charger includes a housing having an outer perimeter that defines a footprint area of the battery charger, a charging circuit positioned within the housing, and a first charging port coupled to the housing and electrically coupled to the charging circuit. The first charging port supports the first battery pack. The battery charger also includes a second charging port coupled to the housing and electrically coupled to the charging circuit. The second charging port supports the second battery pack while the first charging port supports the first battery pack. A ratio of a sum of the first and second amounts of energy in Watt-hours to the footprint area in square-inches is at least about 1.2.

In yet another embodiment, the invention provides a battery charging system including a first battery pack having a first set of battery cells operable to store a first amount of energy, a second battery pack having a second set of battery cells operable to store a second amount of energy, and a battery charger for charging the first and second battery packs. The battery charger includes a housing having an outer surface that defines a volume of the battery charger, a charging circuit positioned within the housing, and a first charging port coupled to the housing and electrically coupled to the charging circuit. The first charging port supports the first battery pack. The battery charger also includes a second charging port coupled to the housing and electrically coupled to the charging circuit. The second charging port supports the second battery pack while the first charging port supports the first battery pack. A ratio of a sum of the first and second amounts of energy in Watt-hours to the volume in cubic-inches is at least about 0.5.

In yet still another embodiment, the invention provides a battery charger for charging a first battery pack and a second battery pack. The battery charger includes a housing and a charging circuit positioned within the housing. The charging circuit is configured to charge the first and second battery packs in series. The battery charger also includes a first charging port coupled to the housing and electrically coupled to the charging circuit. The first charging port is configured to support the first battery pack. The battery charger further includes a second charging port coupled to the housing and electrically coupled to the charging circuit. The second charging port is configured to support the second battery pack while the first charging port supports the first battery pack. The battery charger also includes an indicator light associated with the first charging port and supported by the housing. The indicator light is operable to blink at a first speed when charging of the first battery pack connected to the first charging port is pending and is operable to blink at a second speed that is different than the first speed when the first charging port detects a fault in the first battery pack.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
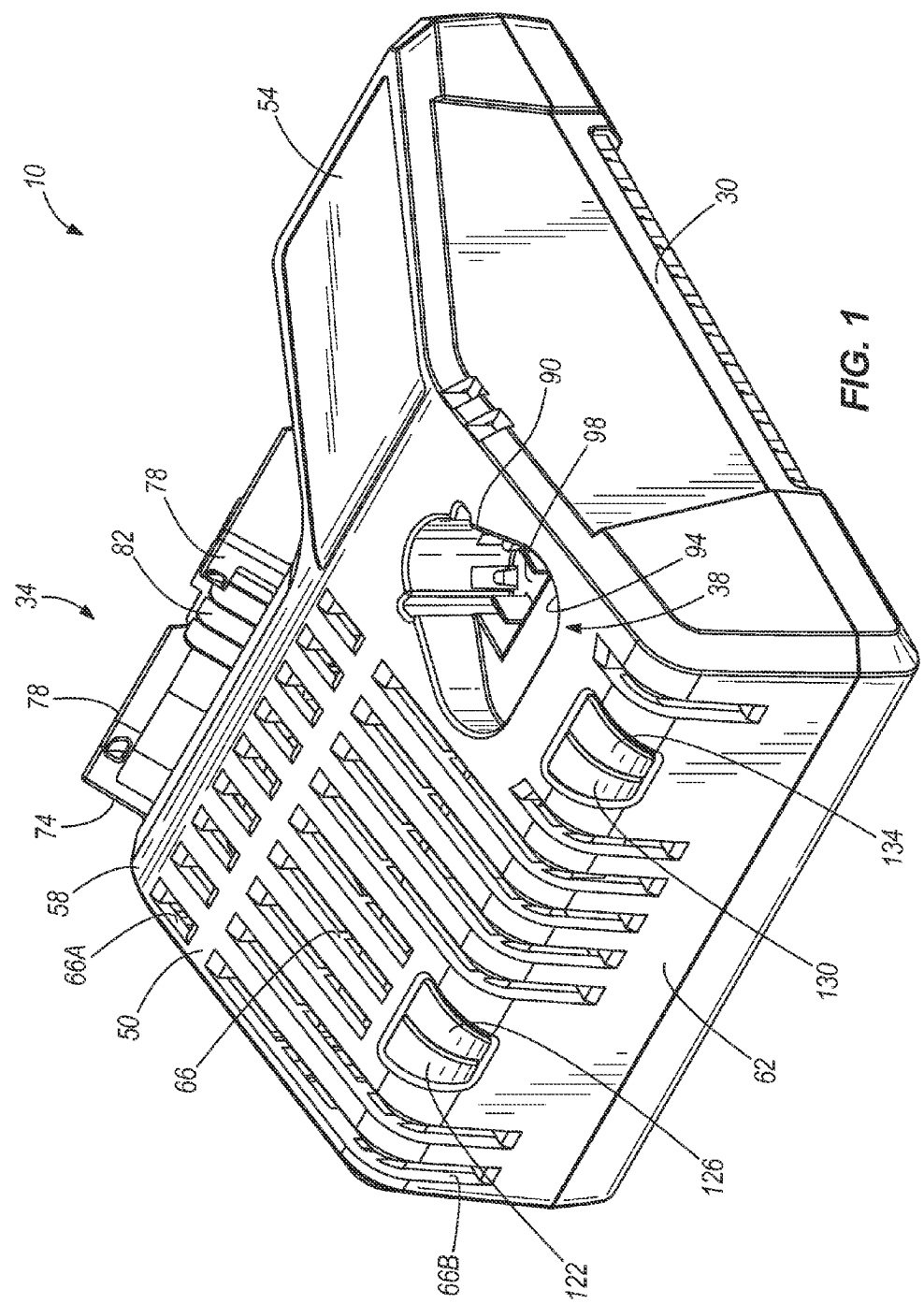
FIG. 1 is a front perspective view of a multi-bay battery charger embodying the invention.
Figure 2:
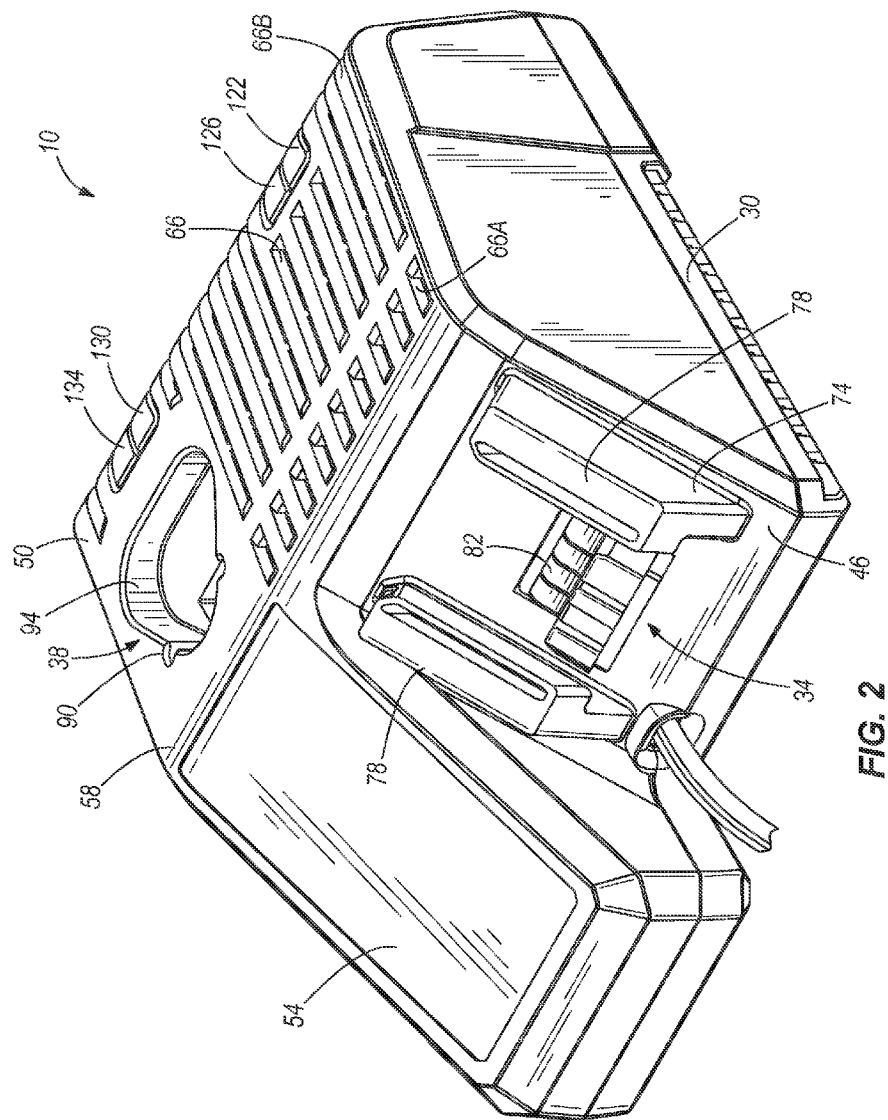
FIG. 2 is a rear perspective view of the multi-bay battery charger.
Figure 3:
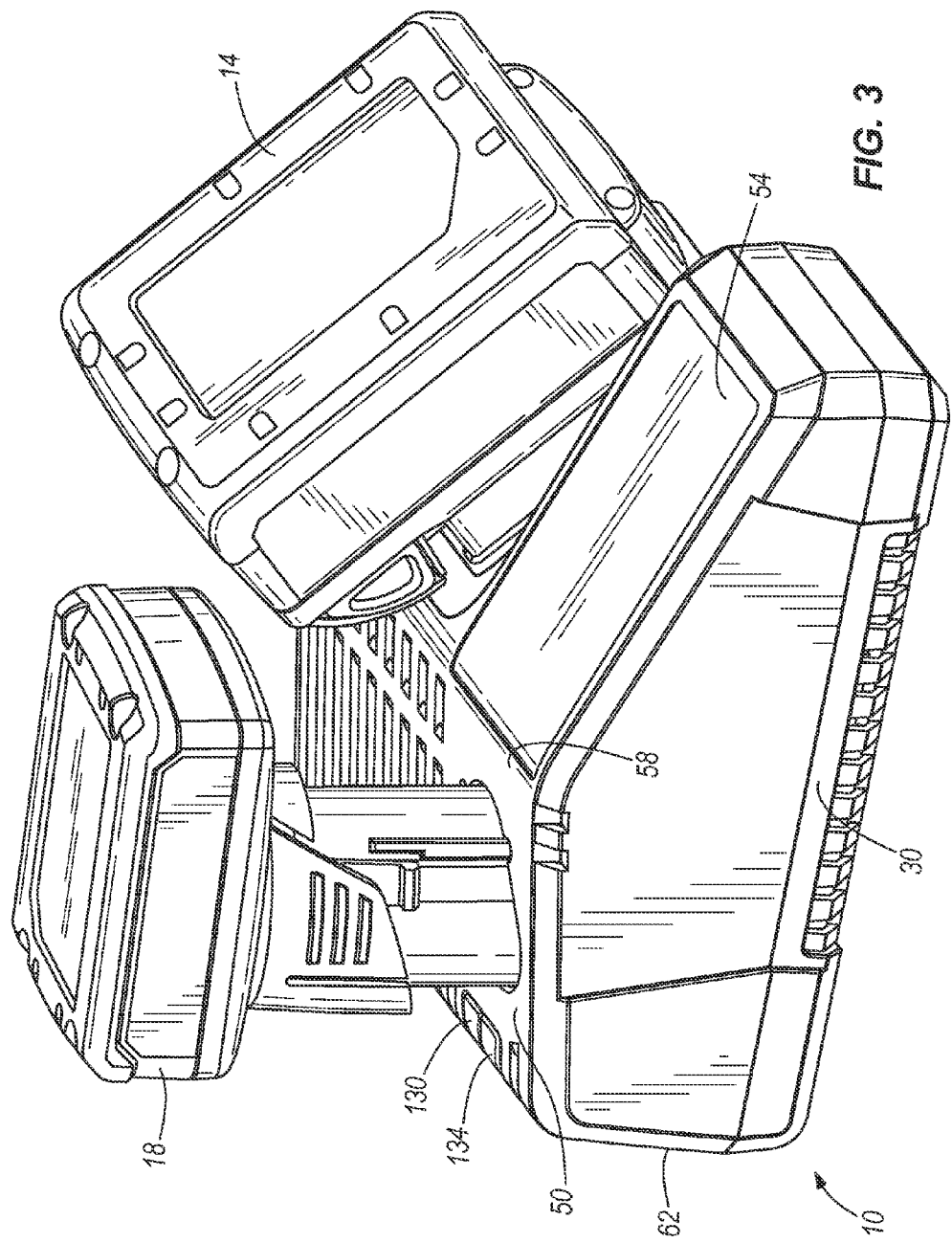
FIG. 3 is a perspective view of the multi-bay battery charger supporting two battery packs.
Figure 4:
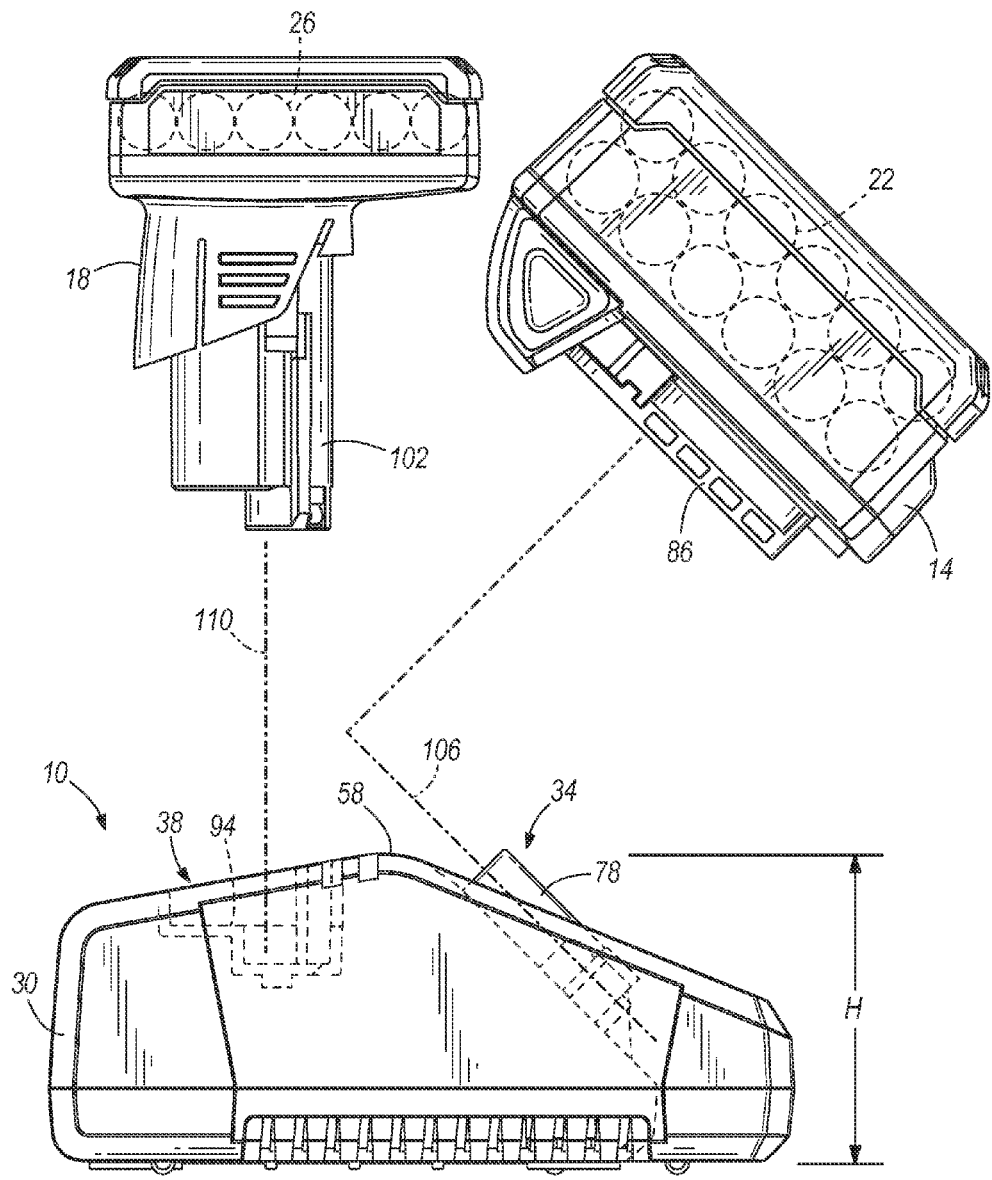
FIG. 4 is a side view of the multi-bay battery charger with the two battery packs separated from the charger.

FIGS. 1-6 illustrate a multi-bay battery charger 10 for charging two battery packs 14, 18 (FIGS. 3 and 4). As shown in FIGS. 3 and 4, the illustrated battery packs 14, 18 are two different styles or types of battery packs usable with portable equipment such as, for example, power tools. The first battery pack 14 is a slide-on style battery pack and may have a voltage of 14.4 volts or 18 volts. The second battery pack 18 is a tower style battery pack and may have a voltage of 12 volts. In the illustrated embodiment, the first battery pack 14 includes ten battery cells 22 that can store about 54 Watt-hours of energy, and the second battery pack 18 includes six battery cells 26 that can store about 32.4 Watt-hours of energy. In other embodiments, the battery packs 14, 18 may be compact battery packs having half the number of battery cells. In such embodiments, the first battery pack 14 may include five battery cells 22 that can store about 27 Watt-hours of energy, and the second battery pack 18 may include three battery cells 26 that can store about 16.2 Watt-hours of energy. In still other embodiments, the battery packs 14, 18 may include high energy cells capable of storing 33% more energy (e.g., about 72 Watt-hours and about 43 Watt-hours, respectively). In further embodiments, the first battery pack 14 may include twenty 4P battery cells, and the second battery pack 18 may include twelve 4P battery cells. In addition, the charger 10 may support any combination of compact, standard, or high energy battery packs.

Referring back to FIGS. 1-6, the illustrated battery charger includes a housing 30, two charging ports 34, 38, and a charging circuit 42 (FIG. 6). The housing 30 is generally composed of plastic and supports and/or encloses the other components of the battery charger 10. The illustrated housing 30 includes three top surfaces 46, 50, 54 that are all angled (i.e., not parallel) relative to each other. In particular, the first surface 46 is oriented at an oblique angle relative to the second surface 50 (see FIGS. 2 and 4). The surfaces 46, 50, 54 generally define separate planes such that each surface 46, 50, 54 is a planar surface. The first surface 46 supports the first charging port 34, while the second surface 50 supports the second charging port 38. The third surface 54 may be covered with logos, instructions, or other information associated with the charger 10. The surfaces 46, 50, 54 connect together to form an apex 58 of the housing 30. The housing 30 is designed to support the charger 10 on a horizontal tabletop or hang the charger 10 from a vertical wall. When the charger 10 is supported on a tabletop, the three surfaces 46, 50, 54 represent the top of the charger 10. When the charger 10 is hung from a wall, a side surface 62 represents the top of the charger 10.

As shown in FIG. 1, the housing 30 defines a plurality of vents 66. Some of the vents 66A are positioned adjacent the apex 58 of the housing 30 to help remove heat from the charger 10 that may collect at the highest point in the housing 30 when the charger 10 is supported on a tabletop. Other vents 66B extend across two surfaces of the housing 30 (e.g., the second surface 50 and the side surface 62). The vents 66B extending onto the side surface 62 help remove heat from the charger 10 when the charger 10 is hanging from a wall.

Figure 5:
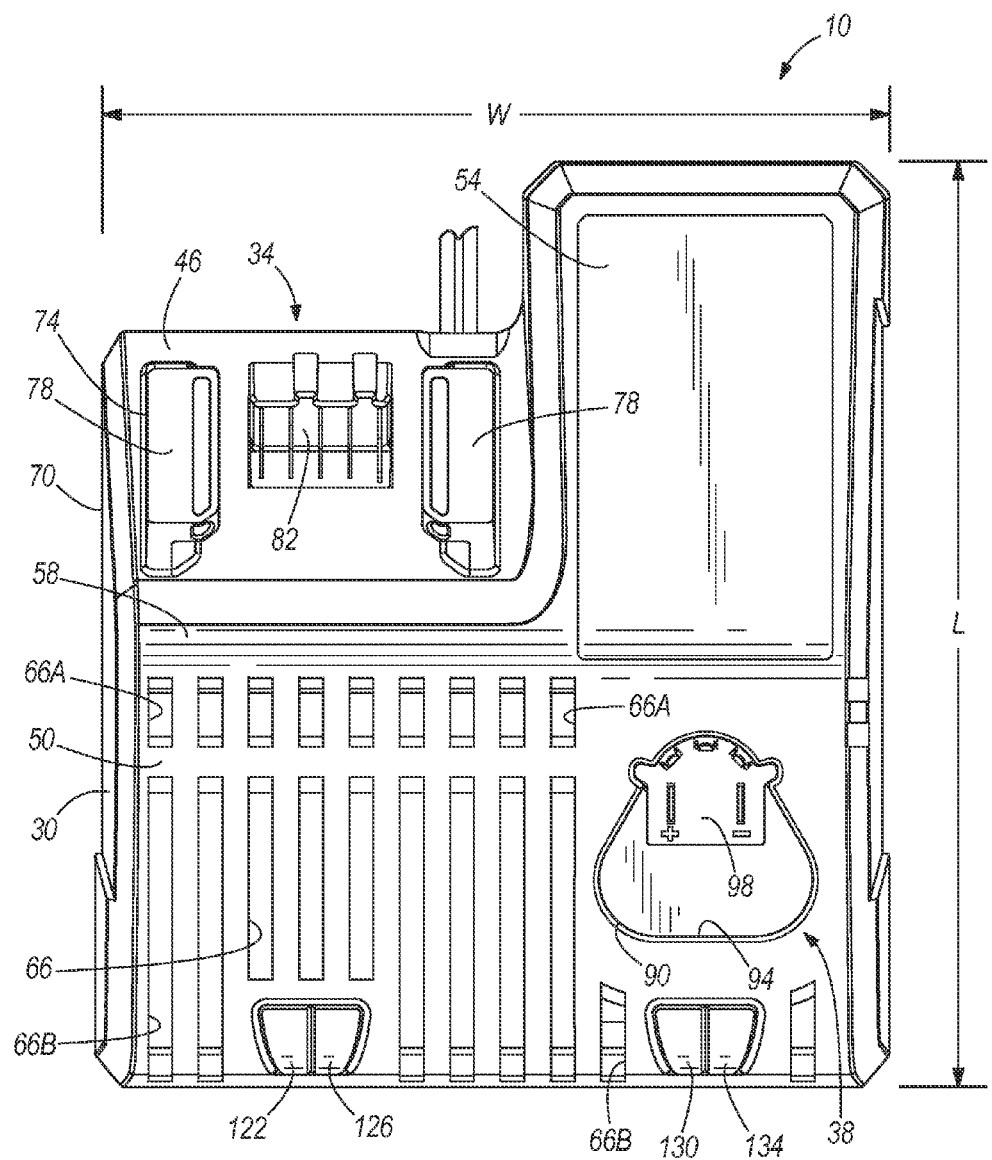
FIG. 5 is a top view of the multi-bay battery charger.

As shown in FIG. 5, the housing 30 has a generally rectangular outer perimeter 70 that defines a footprint area of the charger 10. In the illustrated embodiment, the housing 30 has major dimensions (e.g., an overall length L, an overall width W, and an overall height H (FIG. 4)) of about 7 inches by about 6 inches by about 3 inches. In such embodiments, the footprint area is about 36 square-inches, due to the cutout area near the first charging port 34. In addition, the outer surfaces of the housing 30 define a volume of the charger 10 of about 86 cubic-inches. In other embodiments, the battery charger 10 may have major dimensions that are larger or smaller, may have a footprint area that is larger or smaller, may have a volume that is larger or smaller, and/or may have a different (e.g., non-rectangular) overall shape.

The charging ports 34, 38 are coupled to the housing 30 to support the battery packs 14, 18 on the charger 10 and to electrically couple the battery packs 14, 18 to the charging circuit 42. The charging ports 34, 38 are configured to charge battery packs having different voltages, chemistries, and/or connecting structures. As shown in FIGS. 2 and 5, the first charging port 34 includes a connecting structure 74 having two spaced apart, parallel guide rails 78 and a terminal block 82. The guide rails 78 are integrally molded with the first surface 46 of the housing 30 and configured to engage corresponding guide rails 86 on the first battery pack 14 (FIG. 4).

The terminal block 82 is electrically coupled to the charging circuit 42 (FIG. 6) to charge the first battery pack 14 when the battery pack 14 is connected to the charging port 34. The terminal block 82 can also communicate with the battery pack 14 to determine the presence of the battery pack 14, the voltage of the battery pack 14, and if the battery pack 14 is experiencing a fault.

As shown in FIGS. 1 and 5, the second charging port 38 includes a connecting structure 90 having a recess 94 and a terminal block 98. The recess 94 is formed in the second surface 50 of the housing 30 and configured to receive a stem portion 102 of the second battery pack 18 (FIG. 4). The terminal block 98 is electrically coupled to the charging circuit 42 (FIG. 6) to charge the second battery pack 18 when the battery pack 18 is connected to the charging port 38. The terminal block 98 can also communicate with the battery pack 18 to determine the presence of the battery pack 18, the voltage of the battery pack 18, and if the battery pack 18 is experiencing a fault.

As shown in FIGS. 3 and 4, the first and second charging ports 34, 38 are positioned on the first and second surfaces 46, 50, respectively, of the housing 30 such that both battery packs 14, 18 may be supported by the battery charger 10 at the same time. In addition, the charging ports 34, 38 are oriented such that the battery packs 14, 18 do not interfere, or otherwise contact each other, when the battery packs 14, 18 are being connected to or removed from the ports 34, 38. The first battery pack 14 slides onto the guide rails 78 of the first charging port 34 along a connection axis 106 that is generally parallel to the first surface 46 of the housing 30. The second battery pack 18 slides into the recess 94 of the second charging port 38 along a connection axis 110 that is close to, but slightly skewed from perpendicular to the second surface 50 of the housing 30. These connection axes 106, 110 are angled (i.e., not parallel) relative to each other due to the orientation of the surfaces 46, 50 and the configuration of the connecting structures 74, 90. As such, two non-parallel motions are required to connect the battery packs 14, 18 to the charger 10.

Due to the arrangement of the charging ports 34, 38 on the housing 30, the battery charger 10 can charge battery packs 14, 18 having a relatively high amount of energy in a relatively compact area or volume. For example, as noted above, the illustrated battery packs 14, 18 can store a combined amount of energy of between about 43 Watt-hours and about 115 Watt-hours. A ratio of this stored energy to the footprint area of the charger 10 (which is about 36 square-inches) is therefore between about 1.2 and about 3.2. In addition, a ratio of this stored energy to the volume of the charger 10 (which is about 86 cubic inches) is therefore between about 0.5 and about 1.3. In embodiments where the battery packs 14, 18 can store a combined amount of energy of about 86 Watt-hours, the ratio of stored energy to the footprint area is about 2.4, and the ratio of stored energy to the volume is about 1.0.

Furthermore, the illustrated battery packs 14, 18 include a combined total of sixteen battery cells 22, 26. A ratio of the total number of battery cells being supported by the charger 10 to the footprint area of the charger 10 is therefore about 0.4, but may be greater if the battery packs 14, 18 include 4P battery cells or may be less if the battery packs 14, 18 are compact packs having half the number of cells. A ratio of the total number of battery cells being supported by the charger 10 to the volume of the charger 10 is therefore about 0.2, but may be greater if the battery packs 14, 18 include 4P battery cells or may be less if the battery packs 14, 18 are compact packs having half the number of cells. In other embodiments, the battery packs 14, 18 may have higher voltages, higher energies, or more battery cells such that these ratios are even larger.

Figure 6:
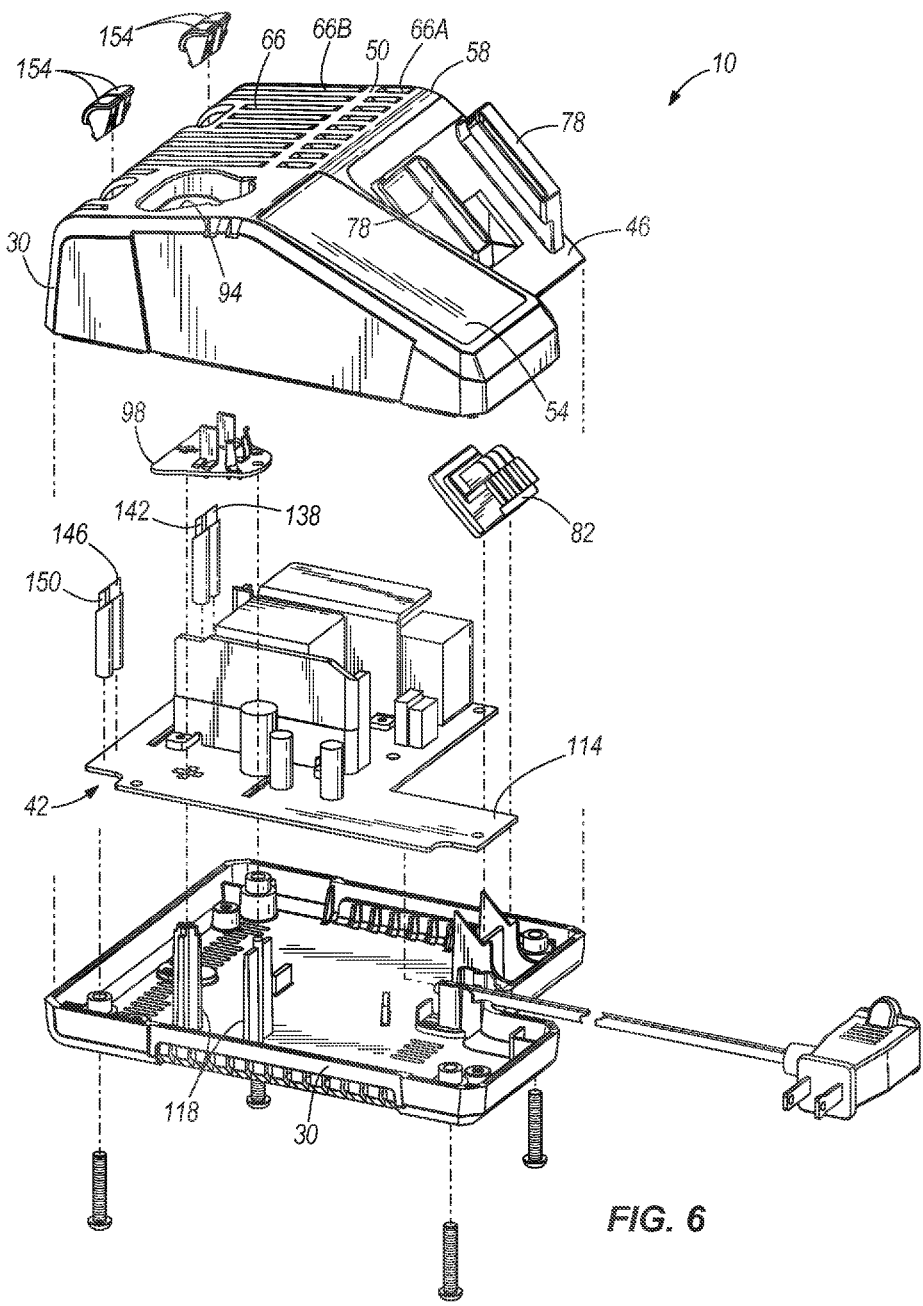
FIG. 6 is an exploded view of the multi-bay battery charger.

As shown in FIG. 6, the illustrated charging circuit 42 is a single charging circuit positioned inside the housing 30. The charging circuit 42 includes a circuit board 114 that is elevated by pedestals 118 within the housing 30 to facilitate cooling. The charging circuit 42 only charges one battery pack at a time and, in particular, charges the battery pack that is connected to the charger 10 first such that the battery packs 14, 18 are charged in series. That is, while a charging current is being delivered to one of the battery packs, a charging current is not delivered to the other battery pack. The battery charger 10 therefore supplies charging current to either the first charging port 34 or the second charging port 38, but not to both ports 34, 38 at the same time. When one of the battery packs is finished charging, the charging circuit 42 automatically switches to begin charging the other battery pack without input from a user. If both battery packs 14, 18 are connected to the charger 10 before the charger 10 is plugged in, the charging circuit 42 defaults to first charge the battery pack connected to, for example, the first charging port 34.

The charging circuit 42 includes protection circuitry to inhibit current from flowing between the battery packs 14, 18 when both battery packs 14, 18 are connected to the charger 10. The protection circuitry may include, for example, two FETs that inhibit current from draining from one battery pack to charge the other battery pack. In other embodiments, the protection circuitry may include diodes to achieve this protection.

As shown in FIGS. 1 and 2, the battery charger 10 also includes four indicator lights 122, 126, 130, 134 associated with the charging ports 34, 38. The lights 122, 126, 130, 134 indicate the charge status of the battery packs 14, 18 connected to the ports 34, 38. In the illustrated embodiment, the battery charger 10 includes two indicator lights 122, 126, 130, 134 associated with each charging port 34, 38. In other embodiments, the battery charger 10 may include fewer or more indicator lights associated with each charging port 34, 38. Referring to FIG. 6, the illustrated indicator lights 122, 126, 130, 134 include LEDs 138, 142, 146, 150 that are electrically coupled to the terminal blocks 82, 98 through the charging circuit 42. One of the LEDs 138, 146 associated with each port 34, 38 may be one color (e.g., green), while the other LED 142, 150 associated with the same port 34, 38 may be a different color (e.g., red).

Each of the illustrated indicator lights 122, 126, 130, 134 also includes a lens 154 (FIG. 6). The lenses 154 are composed of clear plastic material and coupled to the housing 30. As shown in FIG. 1, each lens 154 extends over a portion of the second surface 50 and a portion of the side surface 62 of the housing 30. Such a configuration facilitates viewing the LEDs 138, 142, 146, 150 when looking at the battery charger 10 from different orientations and when the charger 10 is hanging from a vertical wall.

While a battery pack is charging, the LEDs 138, 142, 146, 150 dedicated to the corresponding charging port 34, 38 illuminate to indicate what is going on. For example, a continuous red light indicates that the battery pack is charging, a continuous green light indicates that charging is complete, and blinking red and green lights indicate an error or fault with the battery pack. In addition, if a battery pack is connected to its charging port 34, 38 while another battery pack is already being charged, one of the LEDs 142, 150 (e.g., the red LED) may blink at a relatively slow speed. This slow speed indicates that charging is pending and will begin when the other battery pack is finished charging. Furthermore, if a battery pack that is outside of a predetermined temperature range (e.g., the battery pack is too hot or too cold to properly charge), the same LED 142, 150 (e.g., the red LED) may blink at a relatively fast speed. This fault is different from other faults (where both LEDs blink) in that, once the battery pack returns to an acceptable temperature, charging may begin.

In the illustrated embodiment, the battery charger 10 does not supply a trickle charge. Rather, if a user leaves one or more battery packs on the charger 10 for a significant period of time and the voltage of the pack drops below a certain threshold, the charger 10 will "tap off" the battery pack by supplying a short charging current. The LEDs 138, 142, 146, 150 do not provide any indication when a "tap off" charge occurs. In other embodiments, the battery charger 10 may supply a trickle charge.

Figure 7:
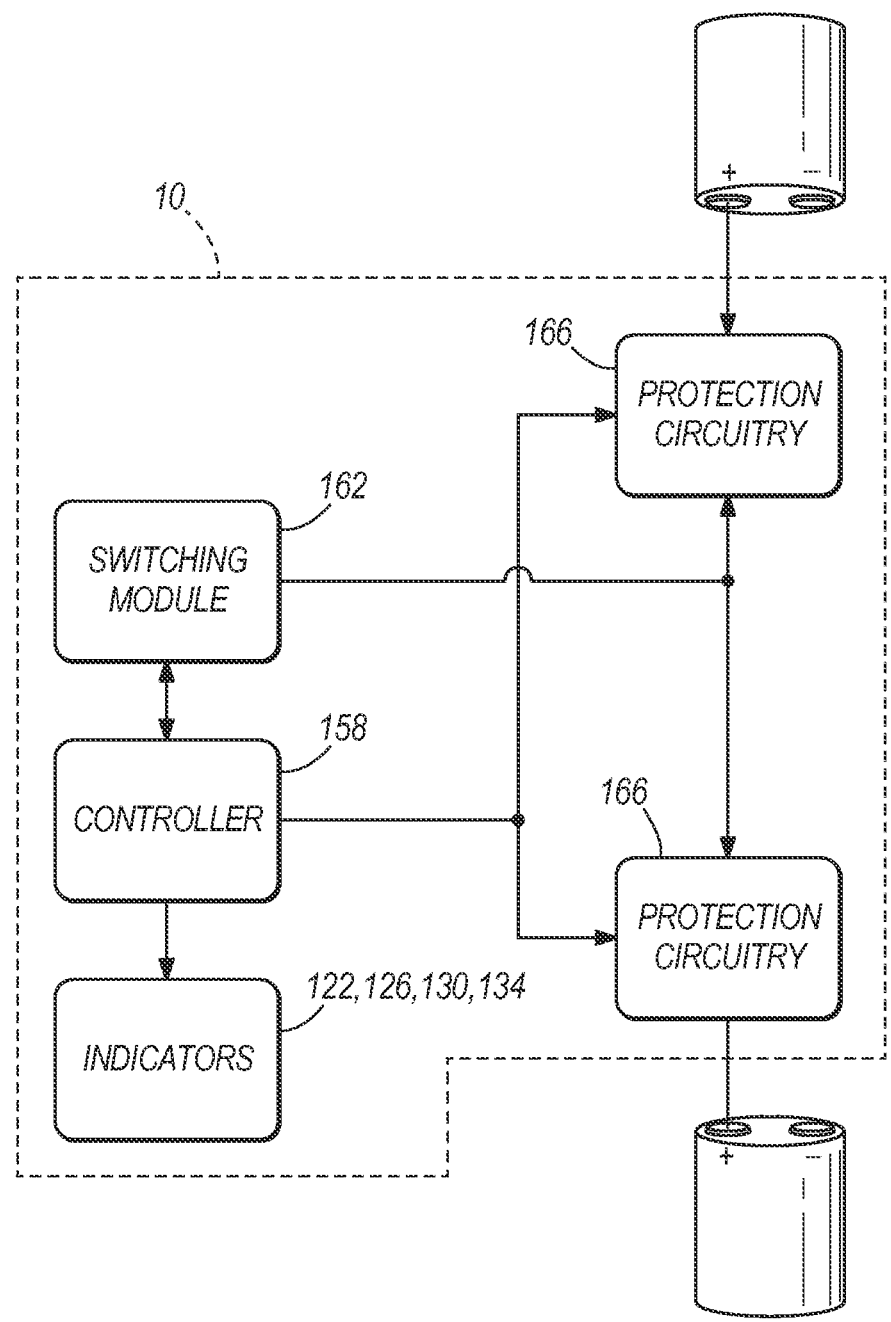
FIG. 7 is a block diagram of the multi-bay battery charger.

FIG. 7 is a block diagram of the multi-bay battery charger 10. The battery charger 10 includes a battery pack control module or controller 158, a power switching module 162, one or more power control safety modules 166, and a plurality of battery pack detection devices or charging port switches (not shown). The controller 158, the power switching module 162, the power control safety modules 166, and the charging port switches work in conjunction with each other to control operation of the charger 10.

The controller 158 is configured to execute a charging control process using corresponding circuitry which determines, among other things, the type of charge required by a battery pack. The controller 158 also detects the presence of a battery pack in each charging port, selects the charging port for charging, controls the power output from the power switching module, and controls the illumination or display of the indicator lights 122, 126, 130, 134. The power switching module 162 uses control signals from the controller 158 to switch application of the charging current between the charging ports 34, 38. The power control safety modules 166 each include a power control safety or protection circuit that is configured to prevent the charging current and/or the charging voltage from damaging the battery charger 10 or a connected battery pack if the charging circuit malfunctions.

In some embodiments, one battery pack detection device is positioned within each charging port 34, 38 and is electrically connected to the controller 158. Each battery pack detection device includes a first conductive part that is coupled to a negative terminal of the power supply module, and a second conductive part that is coupled to the controller 158 and is powered at a control voltage. The first conductive part and the second conductive part are separated from one another by a fixed distance, and an insulating part electrically insulates the first conductive part from the second conductive part. The distance between the first conductive part and the second conductive part is bridged by a terminal of a battery pack when the battery pack is inserted into the charging port.

As discussed above, the controller 158 is configured to charge one battery pack at a time. In the illustrated embodiment, the battery charger 10 will sequentially charge the battery packs 14, 18 in the order they were connected to the charger 10. In alternative embodiments, the controller 158 may cycle serially through the charging ports 34, 38 to determine parameters regarding the battery packs 14, 18 that are inserted into each port 34, 38. These parameters may include the presence of a battery and which, if any, of the battery packs inserted into the charging ports requires a fast charge (e.g., a charge from 0% capacity to 95% capacity). For example, in one embodiment, if the controller 158 determines that a battery pack inserted into the second charging port 38 requires fast charging, the controller 158 directs the power switching module 162 to charge the battery pack 18 in the second charging port 38 before charging the battery pack 14 in the first charging port 34. When the battery pack 18 in the second charging port 38 has finished fast charging, the controller 158 returns to charging the battery pack 14 in the first charging port 34.

In other embodiments, the controller 158 may direct the power switching module 162 to supply a charge to both of the battery packs 14, 18 inserted into the charging ports 34, 38 of the charger 10. For example, the controller 158 may enter a float charge mode that directs the power switching module 162 to sequentially provide a charging current to both of the inserted battery packs 14, 18. Once a given battery pack is fully charged, the controller 158 will direct the power switching module 162 to stop supplying charging current to the fully charged battery pack. The controller 158 will then periodically check the status of the fully charged battery pack. If a drop in output voltage from the once fully charged battery pack is detected, the controller 158 will direct the power switching module 162 to supply a charging current to the applicable charging port and to the battery pack until the battery pack is again fully charged.

In further embodiments, the controller 158 may be configured to selectively charge the battery pack that will charge the fastest. In these embodiments, as the controller 158 serially cycles through the charging ports 34, 38, the controller 158 detects the relative state of charge of each battery pack and determines which battery pack can be charged in the shortest period of time. When the identified battery pack is fully charged, the controller 158 begins charging the battery pack connected to the other charging port.

In the illustrated embodiment, each charging port 34, 38 includes, or is operatively associated with, one of the battery protection circuitry or power control safety modules 166 to prevent damage to the battery packs 14, 18 and the battery charger 10 during a malfunction (e.g., a short circuit). In one embodiment of the power control safety modules 166, if one or more of the charging ports 34, 38 is malfunctioning, the circuitry of the power control safety module 166 protects the battery packs 14, 18 and the battery charger 10 from being damaged without rendering the remaining functional charging port inoperable. For example, the circuitry of the power control safety module 166 is configured to monitor the voltage of a predetermined node. If a voltage is detected at the node, a MOSFET is turned to the "on" state, and current flows through a control resistor. The control resistor is adjacent to and thermally coupled with a thermal fuse. A majority of the charging voltage is dissipated by the control resistor, which causes the control resistor to produce a substantial amount of heat in a short period of time. The heat generated by the control resistor is sufficient to open circuit (e.g., blow) the thermal fuse and prevent the charging current from reaching the battery pack.

The controller 158 is configured to identify defective charging ports and battery packs, and to provide an indication, such as a flashing LED, multiple flashing LEDs, or another indication device, to identify the charging port and/or the battery pack as defective. A defective charging port is identified by the controller 158, for example, when the power switching module 162 is providing a charging current to a charging port which is not receiving a charging signal from the controller 158, or when a charging port that is receiving a charging signal from the controller 158 is not receiving a charging current from the power switching module 162 (e.g., when a fuse has opened). If, for example, a port FET is shorted, the controller 158 detects the shorted FET and disables the defective port to prevent a battery pack from being charged by the defective port. In some embodiments, the defective port signal continues as long as the battery charger 10 is powered. To reset the error condition, power must be removed from the charger 10 to reset the controller 158. Additionally or alternatively, in the instance of a defective battery pack, the battery charger 10 provides an indication via a flashing LED, multiple flashing LEDs, or another indication device, to a user. The error condition is then reset once the defective battery pack is removed.

In some embodiments, the controller 158 is powered by one of the battery packs 14, 18 inserted into the charging ports 34, 38. In such embodiments, the battery charger 10 may include a separate internal battery or capacitor to power the controller 158 in the event the battery charger 10 loses power or the inserted batteries are deeply discharged and have insufficient power to operate the controller 158. The internal battery or capacitor provides the controller 158 with sufficient power to turn off relay coils and other control circuitry in the event that there is insufficient power to operate the battery charger 10.

In other embodiments, the battery charger 10 includes at least one heating element. The controller 158 is configured to monitor and detect the temperature of inserted battery packs. In the event that the controller 158 determines that the measured temperature is below a predetermined minimum temperature, the controller 158 directs the power switching module 162 to power the at least one heating element. When the controller 158 detects that the battery temperature is at or above the predetermined minimum temperature, the controller 158 directs the power switching module 162 to remove power from the heating element. Additionally or alternatively, the battery charger 10 includes a fan to circulate air heated by the heating element around and about the plurality of inserted battery packs. In one embodiment, the controller 158 directs the power switching module 162 to power the fan when the heating element is active and to stop powering the fan when the heating element is inactive. In another embodiment, the controller 158 directs the power switching module 162 to power the fan and remove power from the fan, based on a time delay or a temperature delay (i.e. start and stop the fan in timed sequence following the start and stop of power to the heating element, or start and stop the fan based upon a detected battery temperature).

The illustrated battery charger 10 may be configured to charge any of a plurality of different types of batteries or battery packs. For example, the battery charger 10 may be capable of charging battery packs having nickel-metal hydride ("NiMH"), nickel-cadmium ("NiCd"), lithium-cobalt ("Li—Co"), lithium-manganese ("Li—Mn"), Li—Mn spinel, or other suitable lithium or lithium-based chemistries. In some embodiments, the battery charger 10 may make a determination of the type of battery pack inserted into the charger based on, for example, a terminal voltage. In other embodiments, the charger 10 may receive information or a signal from a battery pack which indicates a battery pack type. In other embodiments, the ports 34, 38 may be structured to receive only compatible battery packs, and the battery charger 10 may merely detect the presence of an inserted pack.

The battery charger 10 may also be configured to receive and charge battery packs having any number of different voltage ratings, capacity ratings, configurations, shapes, and sizes. For example, the battery charger 10 may be operable to charge battery packs having voltage ratings of 4V, 8V, 12V, 14.4V, 16V, 18V, 20V, 24V, 48V, etc., or battery packs having any voltage rating therebetween. The battery charger 10 may also be operable to charge battery packs having individual cells with capacity ratings of 1.2 Ah, 1.3 Ah, 1.4 Ah, 2.0 Ah, 2.4 Ah, 2.6 Ah, 3.0 Ah, etc. The individual cell capacity ratings are combined to produce a total battery pack capacity rating, which is based both on the capacity ratings of the individual cells and the number of cells in each battery pack.

The configurations, shapes, and sizes of the battery packs include but are not limited to configurations, shapes, and sizes of battery packs that are attachable to and detachable from electrical devices such as power tools, test and measurement equipment, vacuum cleaners, outdoor power equipment, and vehicles. Power tools include, for example, drills, circular saws, jigsaws, band saws, reciprocating saws, screw drivers, angle grinders, straight grinders, hammers, impact wrenches, angle drills, inspection cameras, and the like. Test and measurement equipment includes, for example, digital multimeters, clamp meters, fork meters, wall scanners, IR temperature guns, and the like. Vacuum cleaners include, for example, stick vacuums, hand vacuums, upright vacuums, carpet cleaners, hard-surface cleaners, canister vacuums, broom vacuums, and the like. Outdoor power equipment includes blowers, chain saws, edgers, hedge trimmers, lawn mowers, trimmers, and the like. Vehicles include, for example, automobiles, motorcycles, scooters, bicycles, and the like.

Although the invention has been described with reference to certain preferred embodiments, variations and modifications exist within the scope and spirit of one or more independent aspects of the invention. For example, in further embodiments, the battery charger 10 may be configured to simultaneously support three or more battery packs for charging.

Various features and advantages of the invention are set forth in the following claims.

The invention claimed is:

1. A battery charger for charging a first battery pack and a second battery pack, the battery charger comprising:
   a housing having a first surface, a second surface, and an apex, the first surface being oriented at an oblique angle relative to the second surface, the first surface and the second surface being connected together along the apex of the housing, the apex forming a highest point of the housing relative to a bottom surface, and the apex being defined at an interface between the obliquely-angled first and second surfaces;
   a charging circuit positioned within the housing;
   a first charging port supported by the first surface of the housing and including a first connecting structure having a first terminal block, the first terminal block electrically coupled to the charging circuit, the connecting structure of the first charging port configured to support the first battery pack, the first charging port defining a first connection axis along which the first battery pack is movable to connect with the charging circuit; and
   a second charging port supported by the second surface of the housing and including a second connecting structure having a second terminal block, the second terminal block electrically coupled to the charging circuit, the connecting structure of the second charging port configured to support the second battery pack while the connecting structure of the first charging port supports the first battery pack, the second charging port defining a second connection axis along which the second battery pack is movable to connect with the charging circuit;
   wherein the first connection axis is angled relative to the second connection axis.

2. The battery charger of claim 1, wherein the first and second battery packs do not interfere with each other when being connected to and removed from the first and second charging ports.

3. The battery charger of claim 2, wherein the housing defines a plurality of vents adjacent the apex.

4. The battery charger of claim 1, wherein the second connecting structure is different than the first connecting structure.

5. The battery charger of claim 4, wherein the first connecting structure includes guide rails configured to engage corresponding guide rails of a slide-on style battery pack, and wherein the second connecting structure includes a recess configured to receive a portion of a tower style battery pack.

6. The battery charger of claim 1, wherein the first charging port is configured to support and charge a battery pack having a first voltage, and wherein the second charging port is configured to support and charge a battery pack having a second voltage that is different than the first voltage.

7. The battery charger of claim 6, wherein the first charging port is configured to support and charge an 18 volt battery pack, and wherein the second charging port is configured to support and charge a 12 volt battery pack.

8. The battery charger of claim 1, wherein the charging circuit is configured to charge the first and second battery packs sequentially.

9. The battery charger of claim 8, wherein the charging circuit is a single charging circuit positioned within the housing.

10. A battery charging system comprising:
    a first battery pack having a first set of battery cells operable to store a first amount of energy;
    a second battery pack having a second set of battery cells operable to store a second amount of energy; and
    a battery charger for charging the first and second battery packs, the battery charger including
       a housing having an outer perimeter that defines a footprint area of the battery charger, the housing also having a first surface, a second surface, and an apex, the first surface being oriented at an oblique angle relative to the second surface, the first surface and the second surface being connected together along the apex of the housing, the apex forming a highest point of the housing relative to a bottom surface, and the apex being defined at an interface between the obliquely-angled first and second surfaces,
       a charging circuit positioned within the housing,
       a first charging port supported by the first surface of the housing and including a first connecting structure having a first terminal block to electrically couple the first battery pack to the charging circuit, the connecting structure of the first charging port supports the first battery pack, and
       a second charging port supported by the second surface of the housing and including a second connecting structure having a second terminal block to electrically couple the second battery pack to the charging circuit, the connecting structure of the second charging port supports the second battery pack while the connecting structure of the first charging port supports the first battery pack;
    wherein a ratio of a sum of the first and second amounts of energy in Watt-hours to the footprint area in square-inches is at least about 1.2.

11. The battery charging system of claim 10, wherein the ratio of the sum of the first and second amounts of energy in Watt-hours to the footprint area in square-inches is between about 1.2 and about 3.2.

12. The battery charging system of claim 10, wherein the sum of the first and second amounts of energy is at least about 43 Watt-hours.

13. The battery charging system of claim 12, wherein the sum of the first and second amounts of energy is between about 43 Watt-hours and about 115 Watt-hours.

14. The battery charging system of claim 13, wherein the sum of the first and second amounts of energy is about 86 Watt-hours.

15. The battery charging system of claim 10, wherein the footprint area is about 36 square-inches.

16. The battery charging system of claim 10, wherein a ratio of the number of cells in the first and second sets of battery cells to the footprint area in square-inches is at least about 0.4.

17. The battery charging system of claim 16, wherein the first battery pack includes at least ten battery cells and the second battery pack includes at least six battery cells.

18. The battery charging system of claim 10, wherein the first battery pack is an 18 volt battery pack and the second battery pack is a 12 volt battery pack.

19. A battery charging system comprising:
a first battery pack having a first set of battery cells operable to store a first amount of energy;
a second battery pack having a second set of battery cells operable to store a second amount of energy; and
a battery charger for charging the first and second battery packs, the battery charger including
a housing having an outer surface that defines a volume of the battery charger, the housing also having a first surface, a second surface, and an apex, the first surface being oriented at an oblique angle relative to the second surface, the first surface and the second surface being connected together along the apex of the housing, the apex forming a highest point of the housing relative to a bottom surface, and the apex being defined at an interface between the obliquely-angled first and second surfaces,
a charging circuit positioned within the housing,
a first charging port supported by the first surface of the housing and including a first connecting structure having a first terminal block electrically coupled to the charging circuit, the connecting structure of the first charging port supports the first battery pack, and
a second charging port supported by the second surface of the housing and including a second connecting structure having a second terminal block electrically coupled to the charging circuit, the connecting structure of the second charging port supports the second battery pack while the connecting structure of the first charging port supports the first battery pack;
wherein a ratio of a sum of the first and second amounts of energy in Watt-hours to the volume in cubic-inches is at least about 0.5.

20. The battery charging system of claim 19, wherein the ratio of the sum of the first and second amounts of energy in Watt-hours to the volume in cubic-inches is between about 0.5 and about 1.3.

21. The battery charging system of claim 19, wherein the sum of the first and second amounts of energy is at least about 43 Watt-hours.

22. The battery charging system of claim 21, wherein the sum of the first and second amounts of energy is between about 43 Watt-hours and about 115 Watt-hours.

23. The battery charging system of claim 22, wherein the sum of the first and second amounts of energy is about 86 Watt-hours.

24. The battery charging system of claim 19, wherein the volume is about 86 cubic-inches.

25. The battery charging system of claim 19, wherein the first battery pack is an 18 volt battery pack and the second battery pack is a 12 volt battery pack.

* * * * *